United States Patent [19]
Cheng

[11] Patent Number: 5,591,943
[45] Date of Patent: Jan. 7, 1997

[54] WEIGHT-SENSING MEMBER FOR AN ELECTRICAL SUSPENSION WEIGHER

[76] Inventor: Liang-Chieh Cheng, No. 4, Lane 404, Chung-Cheng S. Rd., Yung-Kang City, Tainan Hsien, Taiwan

[21] Appl. No.: 258,576

[22] Filed: Jun. 10, 1994

[51] Int. Cl.⁶ .................... B66C 1/40; G01G 23/02; G01L 5/00; G01L 1/04
[52] U.S. Cl. .................... 177/147; 177/154; 177/229; 73/862.56; 73/862.632
[58] Field of Search .................... 177/154, 155, 177/156, 157, 158, 159, 229, 211, 147; 73/796, 862.632, 862.635, 862.56, 862.57

[56] References Cited

U.S. PATENT DOCUMENTS

| | | | |
|---|---|---|---|
| 3,240,057 | 3/1966 | Ormond | 73/796 |
| 3,315,202 | 4/1967 | Johns et al. | 73/796 |
| 3,376,537 | 4/1968 | Pugnaire | 73/796 |
| 3,911,737 | 10/1975 | Ormond | 73/862.632 |
| 3,969,935 | 7/1976 | Shoberg | 73/862.635 |
| 4,282,762 | 8/1981 | Zenker | 73/862.52 |
| 4,283,941 | 8/1981 | Kutsay | 73/862.635 |
| 4,338,825 | 7/1982 | Amlani et al. | 177/211 |
| 4,467,661 | 8/1984 | Somal | 177/229 |
| 4,566,341 | 1/1986 | Kovács | 73/862.635 |

Primary Examiner—Brian W. Brown
Assistant Examiner—Randy W. Gibson
Attorney, Agent, or Firm—Cushman Darby & Cushman; IP Group of Pillsbury Madison & Sutro LLP

[57] ABSTRACT

A weight-sensing member is made from material with good toughness and elastic deformability characteristics and has a top end, a bottom end and a broadened portion located between and integral with the first and second ends. The broadened portion has a pair of opposed peripheries between the top and bottom ends, a horizontally extending through-hole, and a pair of S-shaped slots formed symmetrically on both sides of the through-hole. Each of the slots begins with an open end at a respective one of the opposed peripheries adjacent to a corresponding one of the top and bottom ends and terminates with a closed end near the through-hole. Each S-shaped slot divides partially the weight-sensing member into two separated parts, namely a higher part near the top end and a lower part near the bottom end. The lower part has a higher portion with a protrusion that extends into an opening that is formed in the higher part. The higher part has a lower portion with a protrusion under the opening of the same and which extends into another opening that is formed in the lower part.

5 Claims, 5 Drawing Sheets

WEIGHT-SENSING MEMBER FOR AN ELECTRICAL SUSPENSION WEIGHER

BACKGROUND OF THE INVENTION

1. Field of the Invention

The invention relates to a weight-sensing member, more particularly to a weight-sensing member to be used in an electrical suspension weigher.

2. Description of the Related Art

FIG. 1 shows a conventional weight-sensing member 1 which is used in an electrical suspension weigher. The conventional weight-sensing member 1 is generally made from a material with good toughness and elastic deformability characteristics, such as steel alloy, and has a top end 101, a bottom end 102 opposite to the top end 101, a broadened portion 103 located between and integral with the top and bottom ends, and a pair of opposed peripheries which extend between the top and bottom ends 101, 102. The top and bottom ends 101, 102 are respectively provided with a first means 11 for suspending the weight-sensing member 1 on a suspension means, such as a roof beam, and a second means 110 to which an article be weighed is suspended. The first and second means 11, 110 are hanging rings. The broadened portion 103 of the weight-sensing member 1 has a horizontally extending through-hole 12 substantially parallel with the hanging rings, and a pair of slots 13 formed symmetrically on both sides of the through-hole 12. Each of the slots 13 is opened at one of the opposed peripheries of the weight-sensing member 1. Four weight-sensing elements 121 are provided at an inner surface which confines the through-hole 12 and are in electrical communication with a display member (not shown) of the electrical suspension weigher.

When an article is suspended to the second means 110, a stress (f) is applied to the broadened portion so as to deform correspondingly the latter. The sensing members 121 detect the deformation of the broadened portion of the weight-sensing member 1 and generate electrical signals corresponding to the amount of deformation which are received by the display member via an electronic device such that digital numerals corresponding to the amount of deformation are shown on the display member.

Although the conventional weight-sensing member 1 can measure the weight applied at the bottom end thereof, it still has the following drawbacks.

(I) If the applied weight exceeds slightly the bearing capacity of the conventional weight-sensing member 1, the stress incurred by the weight-sensing member 1 is concentrated adjacent to the closed end of the slot 13 and the periphery that confines the through-hole 12. Some cracks appear on the broadened portion 103 at the places marked by G1 and G2.

(II) In the event that the applied weight exceeds considerably the bearing capacity of the weight-sensing member, the broadened portion 103 breaks into pieces along G1 or G2. This may cause injury the persons near the suspension weigher.

SUMMARY OF THE INVENTION

A main objective of the present invention is to provide a weight-sensing member which does not break easily along a narrower portion of the same, which narrower portion is formed due to the provision of the slots.

A second objective of the present invention is to provide a weight-sensing member to be used in an electrical suspension weigher which has a unique configuration such that it does not break untimely into pieces upon bearing an excessive load.

Accordingly, a weight-sensing member of the present invention, which is to be used in an electrical suspension weigher, is made from a material with good toughness and elastic deformability characteristics and has a top end with a first means to be suspended on a suspending means, a bottom end with a second means for suspending an article that is to be weighed, and a broadened portion located between and integral with the first and second ends. The broadened portion has a pair of opposed peripheries that extend respectively between the first and second ends, a through-hole aligned with the first and second means and a pair of slots formed symmetrically on both sides of the through-hole. Each of the slots begins with an open end at a respective one of the opposed peripheries adjacent to a corresponding one of the top and bottom ends and terminates with a closed end near the through-hole. Each of the slots divides partially the weight-sensing member into two separate parts on both sides of the same, namely a higher part near the top end and a lower part near the bottom end. The lower part has a higher portion with a protrusion that extends along the slot and that projects into an opening which is formed in the higher part. The higher part has a lower portion with a protrusion under the opening of the same and which extends along the slot into another opening that is formed in the lower part under the protrusion thereof. When the lower part is deformed downwardly due to suspension of an article at the second means of the bottom end of the weight-sensing member while the first means is suspended on the suspending means, the protrusion of the lower part moves downward so as to abut by the protrusion of the higher part. Since, the higher part is capable of bearing and supporting the lower part in the event of deformation, the broadened portion in the weight-sensing member of the present invention does not tear easily when compared to the conventional weight-sensing member.

In the disclosed embodiment, each of the slots is formed successively by a first section which begins with the open end and which extends toward a line that passes through the through-hole and the first and second means, a second section which extends parallel to the line in a direction toward one of the top and bottom ends, a third section which extends in a direction toward the respective periphery, a fourth section which extends parallel to the line in a direction toward the other one of the top and bottom ends and a fifth section that extends parallel to the first section and that terminates with the closed end. The third section of the slot is preferably constructed to possess a width which is smaller than the other sections of the same such that the downward advance of the protrusion of the lower part due to the applied weight can be stopped by the protrusion of the upper part. Thus the weight-sensing member of the present invention is prevented from breaking into pieces in the event that the applied weight exceeds beyond the bearing capacity of the same.

Each of the slots preferably has a pair of inclined sections which communicate respectively the first and second sections, and the fourth and fifth section. The third section of each slot is preferably parallel to the inclined sections thereof.

Due to the unique configuration of the slots, the weight-sensing member of the present invention is more durable when compared to the conventional weight-sensing member.

BRIEF DESCRIPTION OF THE DRAWINGS

Other features and advantages of the present invention will become more apparent in the following detailed description of the preferred embodiments with reference to the accompanying drawings, in which.

DETAILED DESCRIPTION OF THE PREFERRED EMBODIMENTS

Figure 1:
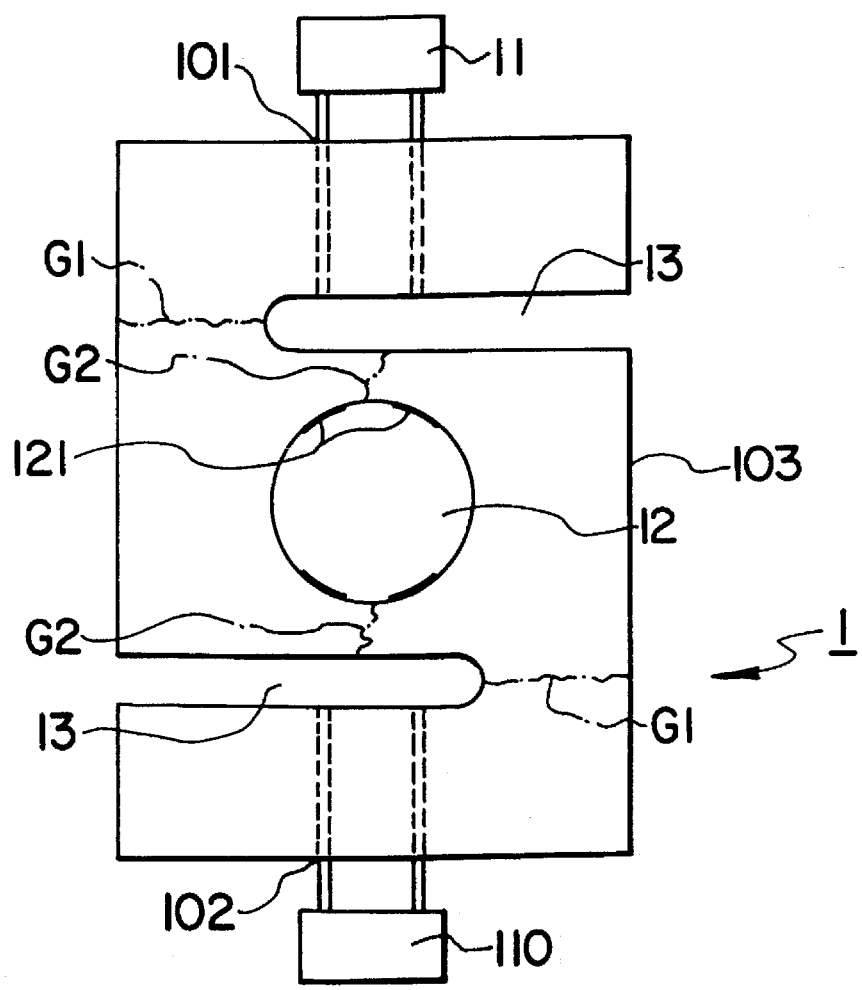
FIG. 1 shows a conventional weight-sensing member that is employed in an electrical weigher.
Figure 1:
Figure 2:
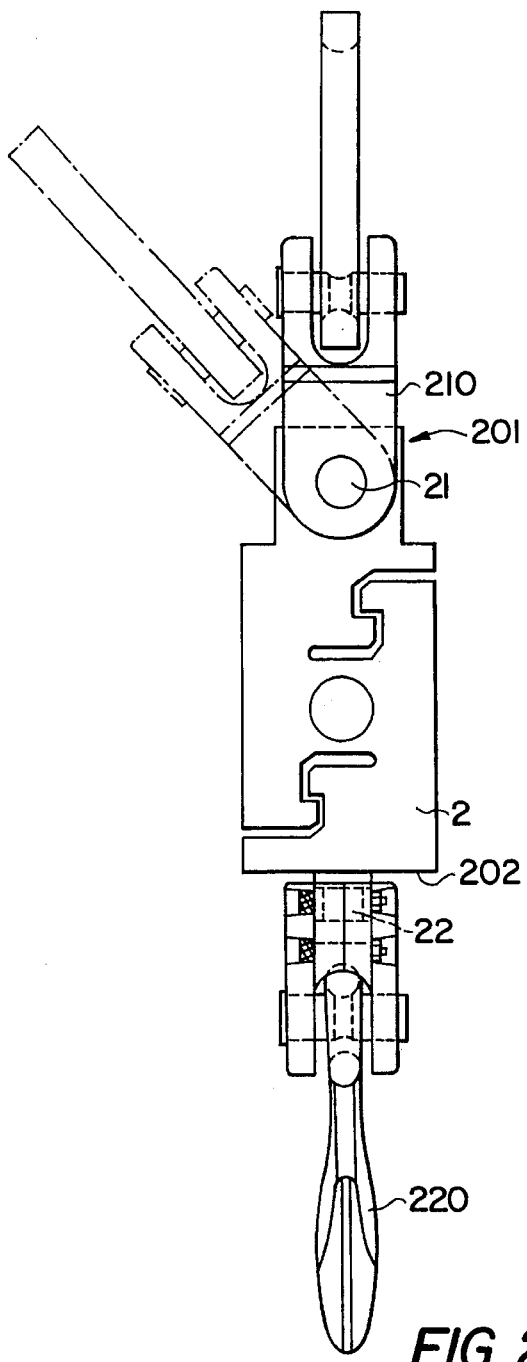
FIG. 2 shows a front view of a weight-sensing member of the present invention that is to be employed in an electrical weigher.
Figure 3:
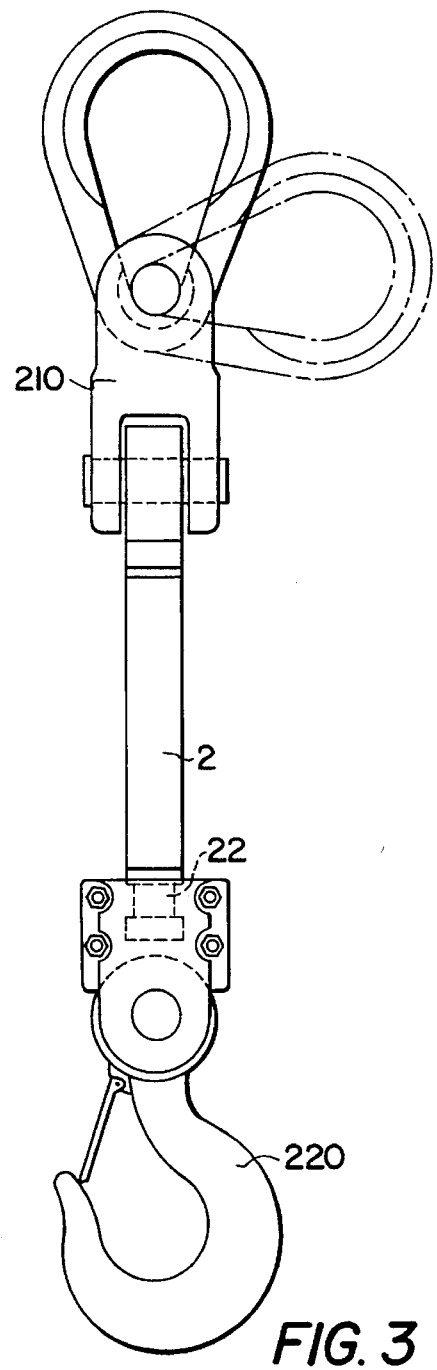
FIG. 3 shows a side view of the weight-sensing member of the present invention.
Figure 4:
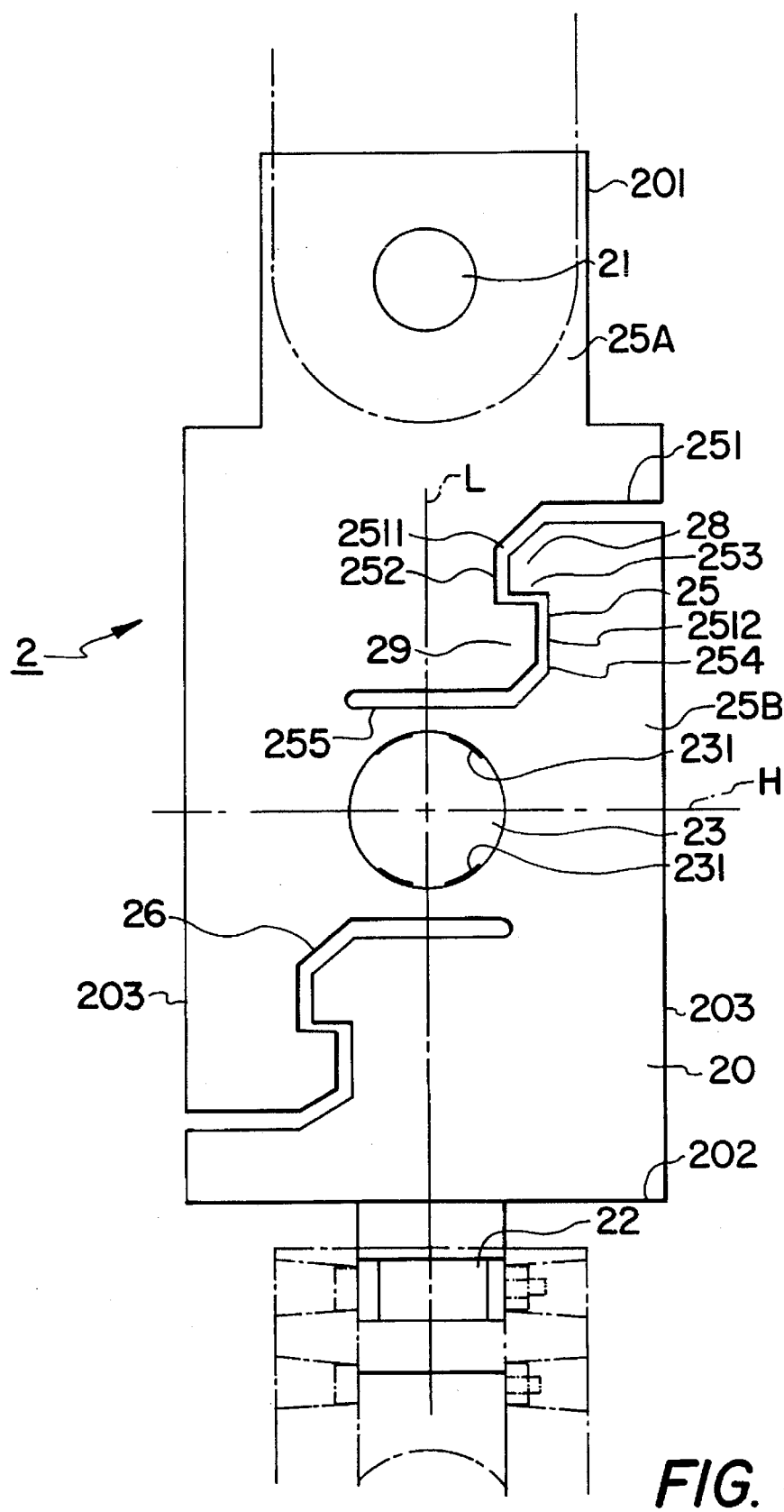
FIG. 4 is an enlarged view of the weight-sensing member of the present invention.

Referring to FIGS. 2, 3 and 4, a weight-sensing member 2 of the present invention is made from a material with good toughness and elastic deformability characteristics, such as steel alloy, and is to be employed in an electrical weigher.

The weight-sensing member 2 has a top end 201 with a first means 21 suspended on a suspending means 210, a bottom end 202 with a second means 22 for suspending an article (not shown) that is to be weighed, and a broadened portion 20 located between and integral with the first and second ends 201, 202. The first and second means 21, 22 are engaging holes, while and the suspending means 210 is a hoisting chain. A hoisting ring 220 is fastened to the engaging hole at the lower end of the weight-sensing member 2 for suspending the article whose weight is to be measured.

The broadened portion 20 has a pair of opposed peripheries 203 which extend respectively between the first and second ends 201, 202, a through-hole 23 which is substantially aligned with the engaging holes 21, 22, and a pair of substantially S-shaped slots 25, 26 formed symmetrically on both sides of the through-hole 23. The broadened portion 20 has an inner surface which confines the through-hole 23. Four weight-sensing elements 231 are provided in the inner surface of the through-hole 23 and are in electrical communication with a display member (not shown) of the weigher via an electronic device. As to how the sensing elements 231 convey data to the display member and how the display member processes data from the sensing elements 231 are readily conceivable by one who is skilled in the art and will not be detailed herein.

Each of the slots 25, 26 begins with an open end at respective one of the pair of opposed peripheries 203 adjacent to a corresponding one of the top and bottom ends 201, 202 and terminates with a closed end near the through-hole 23.

Figure 5:
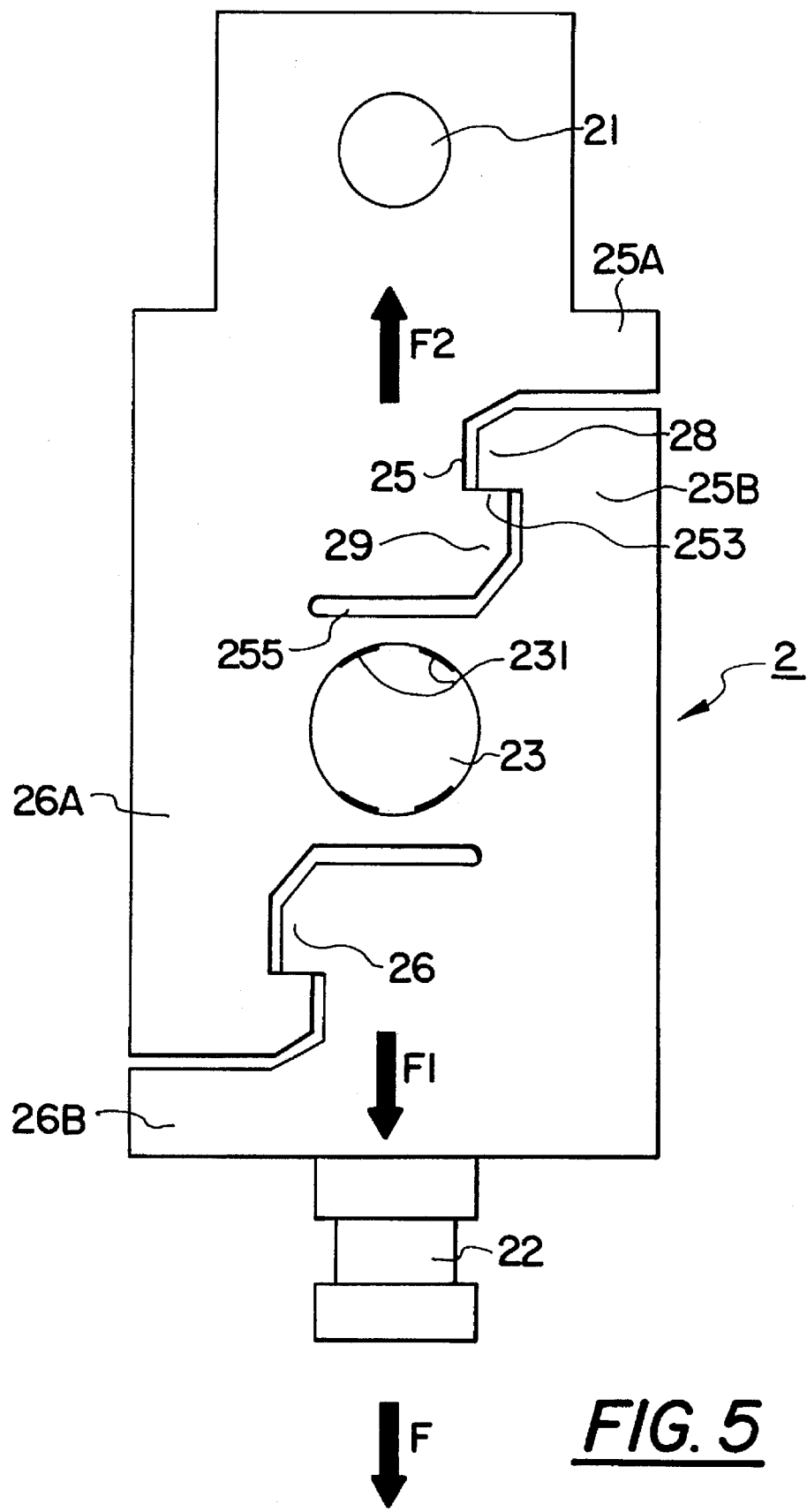
FIG. 5 shows the stresses which are applied on the weight-sensing member due to an applied weight.

Referring to FIGS. 4 and 5, each of the slots 25, 26 divides partially the weight-sensing member on one side of a horizontal line (H) that passes through a center of the through-hole 23 into two separate parts, namely a higher part 25A or 26A near the top end 201 and a lower part 25B, 26B near the bottom end 202. Only the slot 25 will be described hereinafter to facilitate understanding of the present invention.

The lower part 25B has a higher portion with a protrusion 28 which extends into an opening 2511 formed in the higher part 25A. The higher part 25A has a lower portion with a protrusion 29 under the opening 2511 and which extends into another opening 2512 that is formed in the lower part 25B under the protrusion 28 thereof. The slot 25 is formed successively with a first section 251 which begins with the open end and which extends toward a line (L) that passes through the through-hole 23 and the engaging holes 21 and 22, a second section 252 which extends parallel to the line (L) in a direction toward the bottom end 202, a third section 253 which extends in a direction toward the respective periphery 203, a fourth section 254 which extends parallel to the line (L) in a direction toward the bottom end 202, and a fifth section 255 which extends parallel to the first section 251 and which terminates with the closed end.

Referring to FIGS. 2 and 5, when a force (F) is applied due to the suspension of an article (not shown) at the hoisting ring 220 of the weight-sensing member 2, two oppositely-directed stresses (F1, F2) are applied to the broadened portion 20 on both sides of the through-hole 23. The broadened portion 20 deforms due to the applied weight, and the deformation is sensed by the sensing element 231 so as to permit viewing of digital numerals corresponding to the amount of deformation at the display member of the weigher.

Figure 6:
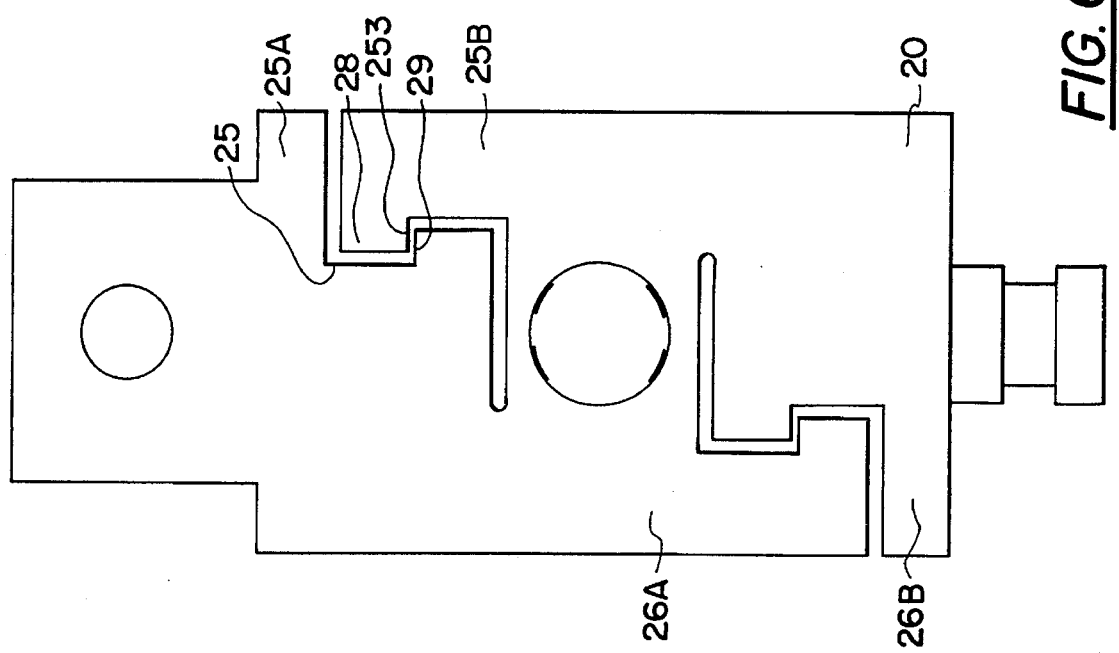
FIG. 6 shows another weight-sensing member of the present invention, the pattern of the slots thereof being slightly different from that of the weight-sensing member shown in FIG. 2.

Referring to FIG. 6, the third section 253 of each slot 25 may be constructed in such a manner that the third section 253 between the protrusions 28, 29 of the higher and lower parts 25A, 25B has a width smaller than the other sections of the same. In the event that the applied weight exceeds the bearing capacity of the weight sensing member 2, deformation of the broadened portion 20 starts at a position adjacent to the closed end of the slot 25. The protrusion 28 of the lower part 25B advances downward and is prevented from further advancement by the protrusion 29 of the higher part 25A. The higher part 25A is thus capable of supporting the lower part 25B when the lower part 25B is deformed due to the suspension of the article (not shown) at the second end 202. A warning device can be installed at the protrusion 29 of the higher part 25A in a known manner so as to generate warning signals when it contacts the protrusion 28 of the lower part 25B. The operator is thus informed that the applied weight has exceeded the bearing capacity of the weight-sensing member of the present invention and can commence the performance of precautionary measures.

Figure 7:
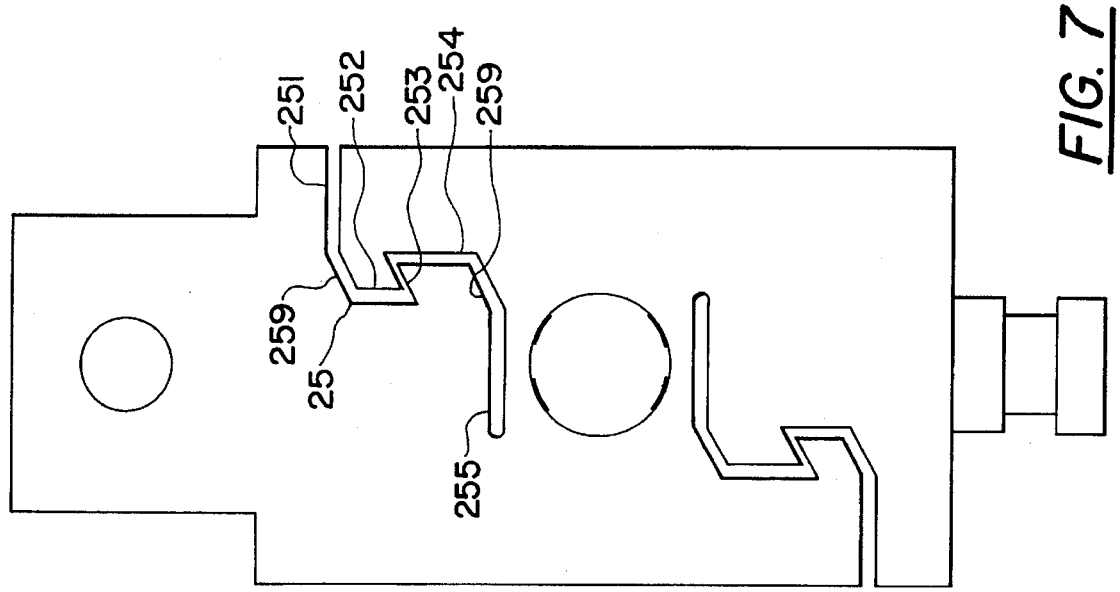
FIG. 7 illustrates still another weight-sensing member of the present invention, the pattern of the slots thereof being slightly different from those of the weight-sensing members' shown in FIGS. 2 and 6.

Referring to FIG. 7, in another embodiment, the slot 25 has a pair of inclined sections 259 which are formed integrally with and which are communicated respectively with the first and second sections 251, 252, and the fourth and fifth sections 254, 255 of the same. The third section 253 is preferably parallel to the pair of inclined sections 259. The feature and objective of this embodiment are the same as those of the previous embodiment.

From the above explanation, it can be clearly seen that the weight-sensing member of the present invention can prevent a lower part from disengaging a higher part because of the presence of the substantially S-shaped slots 25, 26. Thus, the weight-sensing member of the present invention is more durable when compared to the conventional weight-sensing member.

While the invention has been described with what is considered to be the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A weight-sensing member to be used in an electrical suspension weigher, said weight-sensing member made of a material with toughness and elastic deformability characteristics and having a top end with a first means to be suspended on a suspending means, a bottom end with a second means for suspending an article that is to be weighed, and a broadened portion located between and integral with said first and second ends, said broadened portion having a pair of opposed peripheries extending respectively between said first and second end, a through-hole aligned with said first and second means and a pair of slots formed symmetrically on both sides of said through-hole, wherein the improvement comprises:

each of said slots beginning with an open end at a respective one of said opposed peripheries adjacent to a corresponding one of said top and bottom ends and terminating with a closed end near said through-hole, each of said slots dividing partially said weight-sensing member into two separate parts on both sides of said one of said slot, said two separate parts each comprising a higher part near said top end and a lower part near said bottom end, said lower part having a higher portion with a protrusion extending along said slot into an opening formed in said higher part, said higher part having a lower portion with a protrusion under said opening extending along said slot into another opening formed in said lower part under said protrusion thereof, said higher part capable of bearing said lower part when said lower part is deformed downwardly due to suspension of said article at said second end means of said bottom end while said first means is suspended on said suspending means, thereby causing said protrusion of said lower part to touch said protrusion of said higher part.

2. A weight-sensing member as defined in claim 1, wherein each of said slots has a section between said protrusions of said lower and higher parts, said section having a width smaller than remaining section of said slot.

3. A weight-sensing member as defined in claim 1, wherein each of said slots is formed successively with a first section beginning with said open end and extending toward a line passing through said through-hole and said first and second means, a second section extending parallel to said line in a direction toward the other one of said top and bottom ends, a third section extending in a direction toward the respective periphery, a fourth section extending parallel to said line in a direction toward the other one of said top and bottom ends, and a fifth section extending parallel to said first section and terminating with said closed end.

4. A weight-sensing member as defined in claim 3, wherein each of said slots further has a pair of inclined sections which are communicated respectively with said first and second sections and said fourth and fifth sections, said third section being parallel to said pair of inclined sections.

5. A weight-sensing member as defined in claim 4, wherein said third section has a width smaller than remaining sections of said slot.

* * * * *